US010578317B2

(12) United States Patent
Deng et al.

(10) Patent No.: US 10,578,317 B2
(45) Date of Patent: Mar. 3, 2020

(54) PASS THROUGH CONVECTION OVEN

(71) Applicant: Hestan Commercial Corporation, Anaheim, CA (US)

(72) Inventors: Eric Deng, Irvine, CA (US); Michael D. Mason, Corona, CA (US); Chris Moy, Monterey Park, CA (US)

(73) Assignee: Hestan Commercial Corporation, Anaheim, CA (US)

(*) Notice: Subject to any disclaimer, the term of this patent is extended or adjusted under 35 U.S.C. 154(b) by 108 days.

(21) Appl. No.: 15/895,403

(22) Filed: Feb. 13, 2018

(65) Prior Publication Data

US 2018/0238560 A1    Aug. 23, 2018

Related U.S. Application Data

(60) Provisional application No. 62/459,019, filed on Feb. 14, 2017.

(51) Int. Cl.
*F24C 15/32* (2006.01)
*F24C 3/00* (2006.01)
*F24C 15/04* (2006.01)
*F24C 15/02* (2006.01)
*A21B 1/26* (2006.01)
*F24C 3/12* (2006.01)
*F24C 15/00* (2006.01)

(52) U.S. Cl.
CPC .............. *F24C 15/322* (2013.01); *A21B 1/26* (2013.01); *F24C 3/004* (2013.01); *F24C 3/122* (2013.01); *F24C 15/006* (2013.01); *F24C 15/02* (2013.01); *F24C 15/028* (2013.01); *F24C 15/04* (2013.01)

(58) Field of Classification Search
CPC ............ A21B 1/26; A21B 1/28; F24C 15/322
USPC ....................................................... 126/21 A
See application file for complete search history.

(56) References Cited

U.S. PATENT DOCUMENTS

| 4,389,562 A | * | 6/1983 | Chaudoir | A21B 1/22 |
| | | | | 219/388 |
| 4,438,572 A | * | 3/1984 | Kaminski | A21B 1/26 |
| | | | | 34/218 |
| 4,763,638 A | * | 8/1988 | Hurley | A21B 3/00 |
| | | | | 126/21 A |
| 5,738,081 A | * | 4/1998 | Puricelli | F24C 14/02 |
| | | | | 126/21 A |
| 6,131,559 A | * | 10/2000 | Norris | A21B 1/245 |
| | | | | 126/21 A |

(Continued)

OTHER PUBLICATIONS

Examiner's Report dated Dec. 21, 2018 issued in connection with corresponding Canadian Application No. 2,995,027.

*Primary Examiner* — Avinash A Savani
*Assistant Examiner* — Aaron H Heyamoto
(74) *Attorney, Agent, or Firm* — Akerman LLP

(57) ABSTRACT

According to one example, a convection oven comprises a cooking chamber having a front door and a rear door opposing the front door; a combustion chamber disposed below at least a portion of the cooking chamber; a side flue conduit configured to direct hot air from the combustion chamber to the cooking chamber; and a side sub-chamber with a convection fan configured to re-circulate at least a portion of the hot air within the cooking chamber, in which the side sub-chamber is disposed adjacent a side of the cooking chamber that is orthogonal to the front and rear door.

13 Claims, 13 Drawing Sheets

(56) References Cited

U.S. PATENT DOCUMENTS

2007/0125760 A1\* 6/2007 Kim ................ F24C 15/04
 219/391
2016/0201924 A1 7/2016 Deng et al.

\* cited by examiner

PASS THROUGH CONVECTION OVEN

CROSS-REFERENCE TO RELATED APPLICATIONS

This application claims priority to U.S. Provisional Patent Application No. 62/459,019 filed on Feb. 14, 2017, the entirety of which is incorporated herein by reference.

TECHNICAL FIELD

This disclosure relates generally to the field of cooking and more specifically to convection ovens used in kitchens for baking foodstuffs.

BACKGROUND

Traditionally, a user has used a convention oven to more quickly and efficiently cook a food item. Such traditional convection ovens, however, may be deficient.

SUMMARY

In a first example, a convection oven comprises: a cooking chamber having a front door and a rear door opposing the front door; a combustion chamber disposed below at least a portion of the cooking chamber; a side flue conduit configured to direct hot air from the combustion chamber to the cooking chamber; and a side sub-chamber with a convection fan configured to re-circulate at least a portion of the hot air within the cooking chamber, in which the side sub-chamber is disposed adjacent a side of the cooking chamber that is orthogonal to the front and rear door.

Another example includes any such convection oven, further comprising a sub-housing positioned opposite the sub-chamber, the sub-housing including a motor configured to rotate the convection fan, and further including a cooling fan that is coupled to the motor and this is configured for exchanging air in the side sub-chamber.

Another example includes any such convection oven, further comprising a means for venting air from the sub-housing.

Another example includes any such convection oven, wherein the means for venting air from the sub-housing comprises a rear vent on a side of the sub-housing.

Another example includes any such convection oven, further comprising a means for drawing air into the sub-housing.

Another example includes any such convection oven, wherein the means for drawing air into the sub-housing comprises a sub-cavity positioned below at least one of a front and a rear portion of the cooking chamber, wherein the sub-cavity is vented to the exterior of the convection oven and is in fluid communication with a lower portion of the sub-housing.

Another example includes any such convection oven, further comprising a means for venting air from the sub-housing.

Another example includes any such convection oven, wherein the means for venting air from the sub-housing comprises a rear vent on a side of the sub-housing.

Another example includes any such convection oven, wherein the sub-housing comprises one or more components for controlling the convection oven.

Another example includes any such convection oven, further comprising at least one external control on an outside of the sub-housing that is adjacent the front door, wherein the external control modulates a component inside the sub-housing that controls at least one aspect of the operation of the convection oven.

Another example includes any such convection oven, further comprising thermal insulation surrounding at least a portion of the cooking chamber and the combustion chamber that is adjacent to and external to the sub-housing.

Another example includes any such convection oven, wherein the at least one external control modulates the speed of the motor.

In a second example, a convection oven comprises: a cooking chamber having a front door and a rear door opposing the front door; a combustion chamber disposed below at least a portion of the cooking chamber; a side flue conduit configured to direct hot air from the combustion chamber to the cooking chamber; a side sub-chamber with a convection fan configured to re-circulate at least a portion of the hot air within the cooking chamber, in which the side sub-chamber is disposed adjacent a side of the cooking chamber that is orthogonal to the front and rear door; a sub-housing positioned opposite the sub-chamber, the sub-housing including a motor configured to rotate the convection fan, and further including a cooling fan that is coupled to the motor and this is configured for exchanging air in the side sub-chamber; and at least one external flue conduit configured to direct a portion of combustion gas outside of the convection oven.

Another example includes any such convection oven, further comprising at least one upper conduit to direct the portion of combustion gas from the cooking chamber to the at least one external flue conduit.

Another example includes any such convection oven, wherein the at least one external flue conduit is disposed on an opposite side of the convection oven from the sub-housing.

Another example includes any such convection oven, further comprising a means for drawing air into the sub-housing.

Another example includes any such convection oven, wherein the means for drawing air into the sub-housing comprises a sub-cavity positioned below at least one of a front and a rear portion of the cooking chamber, wherein the sub-cavity is vented to the exterior of the convection oven and is in fluid communication with a lower portion of the sub-housing.

Another example includes any such convection oven, further comprising at least one external control on an outside of the sub-housing that is adjacent the front door, wherein the external control modulates a component inside the sub-housing that controls at least one aspect of the operation of the convection oven.

Another example includes any such convection oven, wherein the at least one external control modulates the speed of the motor.

Another example includes any such convection oven, further comprising thermal insulation surrounding at least a portion of the cooking chamber and the combustion chamber that is adjacent to and external to the sub-housing.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Embodiments of the present disclosure are best understood by referring to FIGS. 1-13 of the drawings, like numerals being used for like and corresponding parts of the various drawings.

FIGS. 1-7 illustrate an example convection oven 100. A convection oven, such as convection oven 100, refers to an oven that uses one or more fans to re-circulate hot air in the cooking area of the oven. By re-circulating hot air using a fan, convection ovens may distribute heat evenly around a food item, removing the blanket of cooler air that surrounds the food item when it is first placed in an oven and allowing the food item to cook more evenly in less time and at a lower temperature than in a conventional oven. Convection ovens typically promote faster cooking and browning, and are the preferred oven in commercial kitchens.

Figure 1:
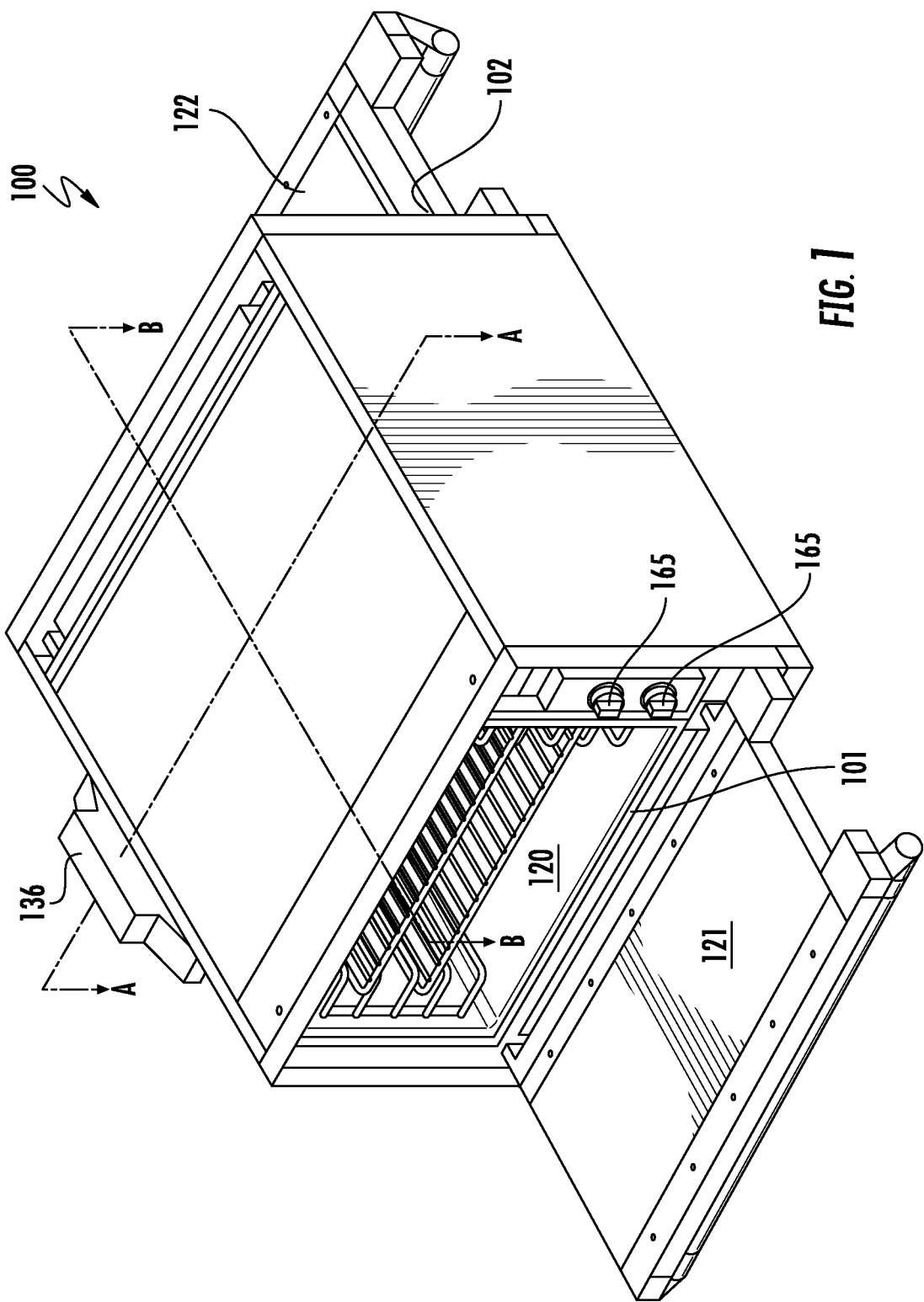
FIG. 1 is perspective view of an example convection oven having two doors on opposing sides, with both doors open.
Figure 2:
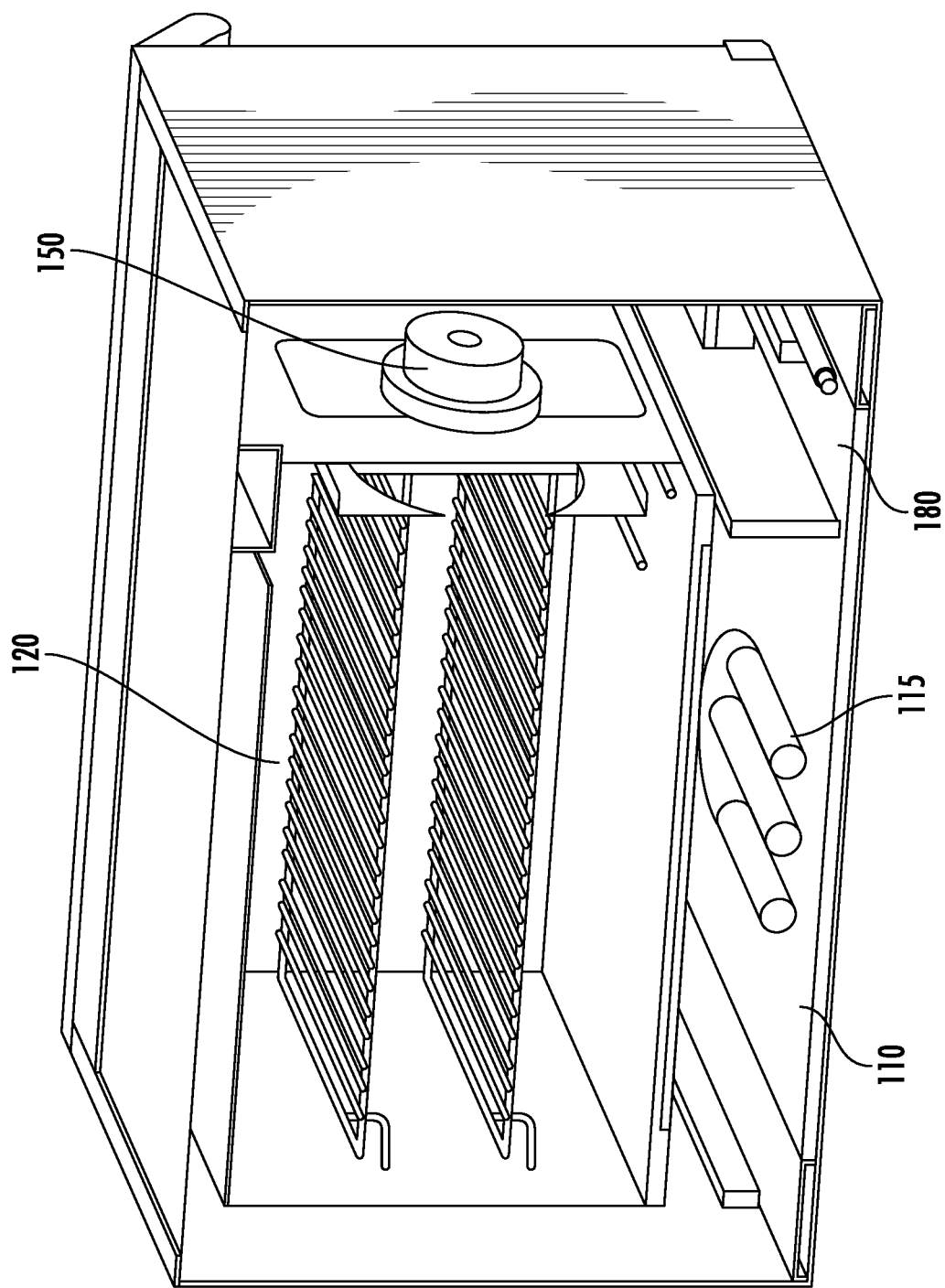
FIG. 2 is a cross-sectional perspective view of the example convection oven of FIG. 1, taken at section line A-A.

As is illustrated in FIG. 2, the convection oven 100 includes a cooking chamber 120 and a combustion chamber 110. The cooking chamber 120 may be any chamber into which a food item may be positioned in order to be cooked using the convection oven 100. The combustion chamber 110 may be any chamber that may generate heat to be used to cook a food item. For example, the combustion chamber 110 may generate heat (e.g., hot air and combustion gases) by burning gas from one or more gas burner manifolds 115. The hot air and combustion gases may exit the combustion chamber 110 and enter the cooking chamber 120 via one or more side flue conduits 130 (illustrated in FIG. 6).

Figure 3:
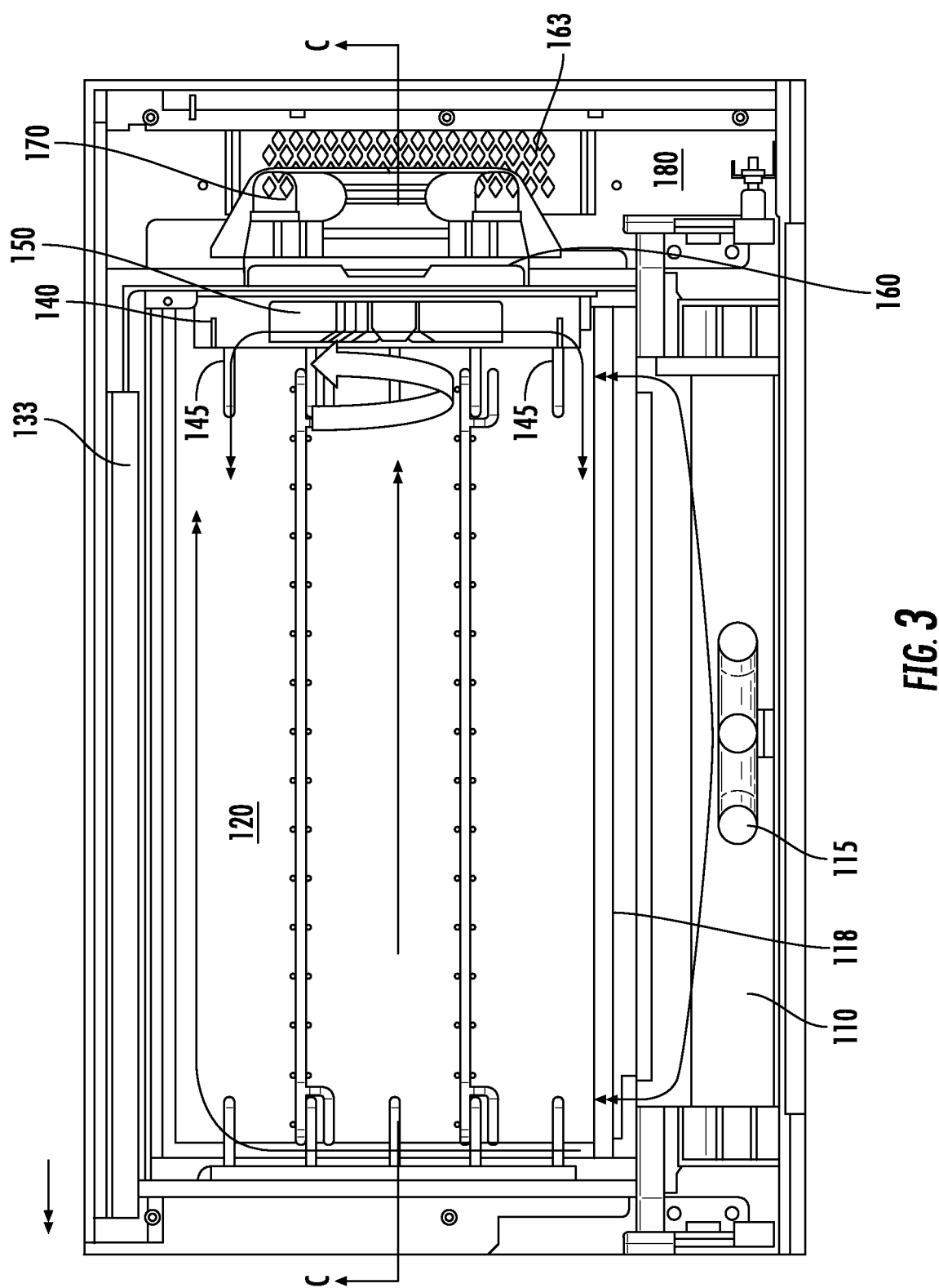
FIG. 3 is a cross-sectional elevation view of the example convection oven of FIG. 1, taken at section line A-A.
Figure 6:
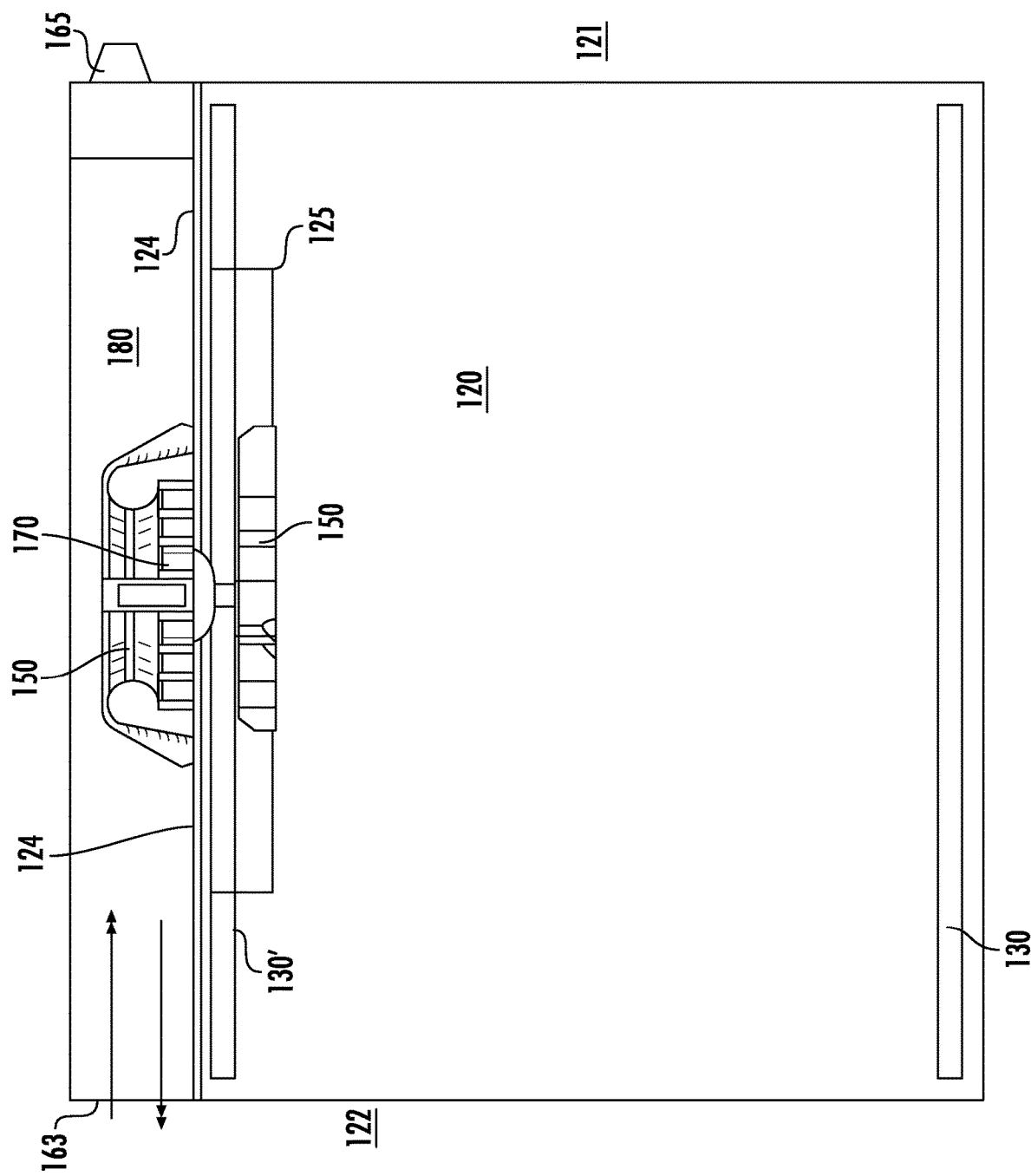
FIG. 6 is a cross-sectional plan view of the example convection oven of FIG. 3, taken at section line C-C.
Figure 7:
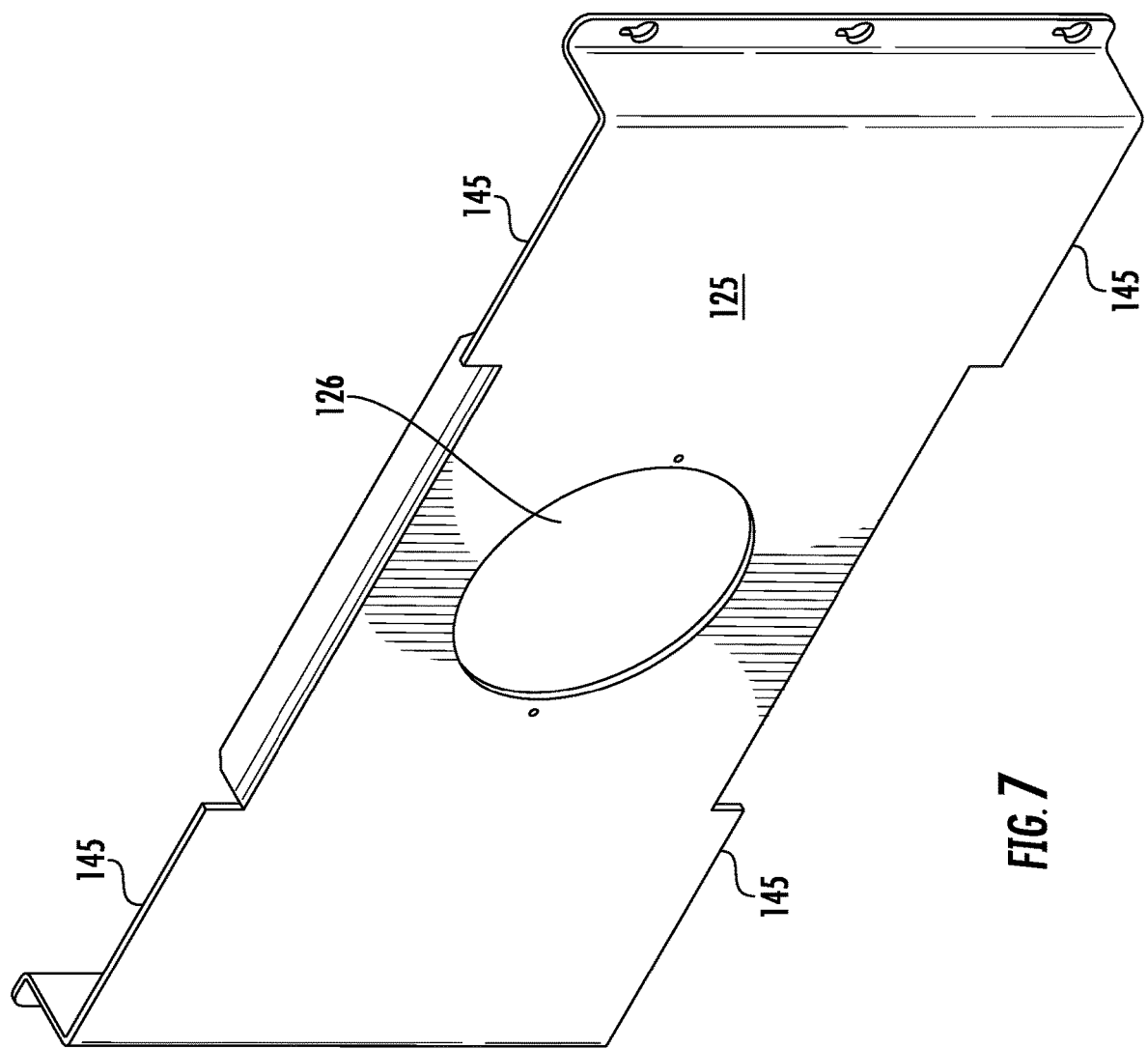
FIG. 7 is a perspective view of an example baffle for the example convection oven of FIG. 3.

The combustion chamber 110 may be disposed below at least a portion of the cooking chamber 110. Furthermore, the combustion chamber 110 may be in fluid communication with the cooking chamber 120 via the one or more side flue conduits 130. The side flue conduit 130 may direct hot air and combustion gas from the combustion chamber 110 to the cooking chamber 120. The convection oven 100 may include only a single side flue conduit 130, or more preferably, may include two such conduits 130 and 130' (as is illustrated in FIG. 6), or more than two such conduits 130. The convection oven 100 may further include an external flue conduit 136 (shown in FIG. 1) for external venting of combustion gas (or other heat) from the cooking chamber 120. Also, the convection oven 100 may also include at least one upper conduit 133 (shown in FIG. 3) to direct at least a portion of the combustion gas from the cooking chamber 120 to the external flue conduit 136, for external venting. Examples of the air flow in-between the combustion chamber 110 and the cooking chamber 120 is illustrated in FIG. 3. Additionally, FIG. 3 further illustrates the air flow inside the cooking chamber 120.

In some examples, the cooking chamber 120 may also be heated by radiation from a horizontal divider 118 (shown in FIG. 3) positioned between the cooking chamber 120 and the combustion chamber 110. This horizontal divider 118 may form the bottom wall of the cooking chamber 120, and may further form the upper wall of the combustion chamber 110. In some examples, the cooking chamber 120 may also include one or more additional radiant heat sources (e.g., gas broilers, electrical broiling elements) positioned on the bottom and/or top walls of the cooking chamber 120, similar to a conventional oven. In some examples, this may allow the convection oven 100 to operate as a conventional oven when, for example, the convection features are turned off.

As illustrated in FIG. 2, the convection oven 100 further includes doors 121 and 122 on opposing sides 101 and 102 of the cooking chamber 120, thereby forming a pass through convection oven. These doors 121 and 122 may both open and close (as shown in FIG. 8B), allowing a food item to be added or removed from the cooking chamber 120 on either side 101 and 102 of the cooking chamber 120. The doors 121 and 122 may be counter-balanced, soft opening oven doors. Furthermore, they may be positioned on opposite ends, allowing users to access the cooking chamber 120 from both sides of the same convention oven 100, or (in most cases) from both sides of a cooking suite/island. This capability may increase productivity within a small footprint. It may also reduce the number of ovens needed, thus lower operating cost, lowering capital cost, lowering heat generated, and/or providing a more comfortable environment.

Unlike convection oven 100, a typical convection oven does not include two doors on opposing sides. Instead, a typical convention oven includes only one door, or multiple doors positioned on the same side of the convention oven. The reasoning for this is that a convection oven uses one or more fans to re-circulate hot air in the cooking area of the oven. These fans can be problematic because they must be positioned on (or in) a surface of the oven. Typically, the fans (and motor system) of a convection oven are positioned on a rear wall of the typical convection oven. This, however, prevents the typical convection oven from having two doors positioned on opposing sides, as the opposing wall (e.g., the rear wall) is usually where the fans (and motor system) are positioned. As is discussed above, unlike typical convection ovens, convection oven 100 includes two doors on opposing sides (e.g., a front door and a rear door). Furthermore, unlike conventional ovens (i.e., non-convection ovens), convection oven 100 also includes one or more fans (discussed below) that re-circulate hot air in the cooking area of the oven. As such, the convection oven 100 may provide access from opposing aisles in a commercial kitchen to improve work flow and efficiency, and reduce foot traffic, yet retain the benefits of convection ovens.

Figure 4:
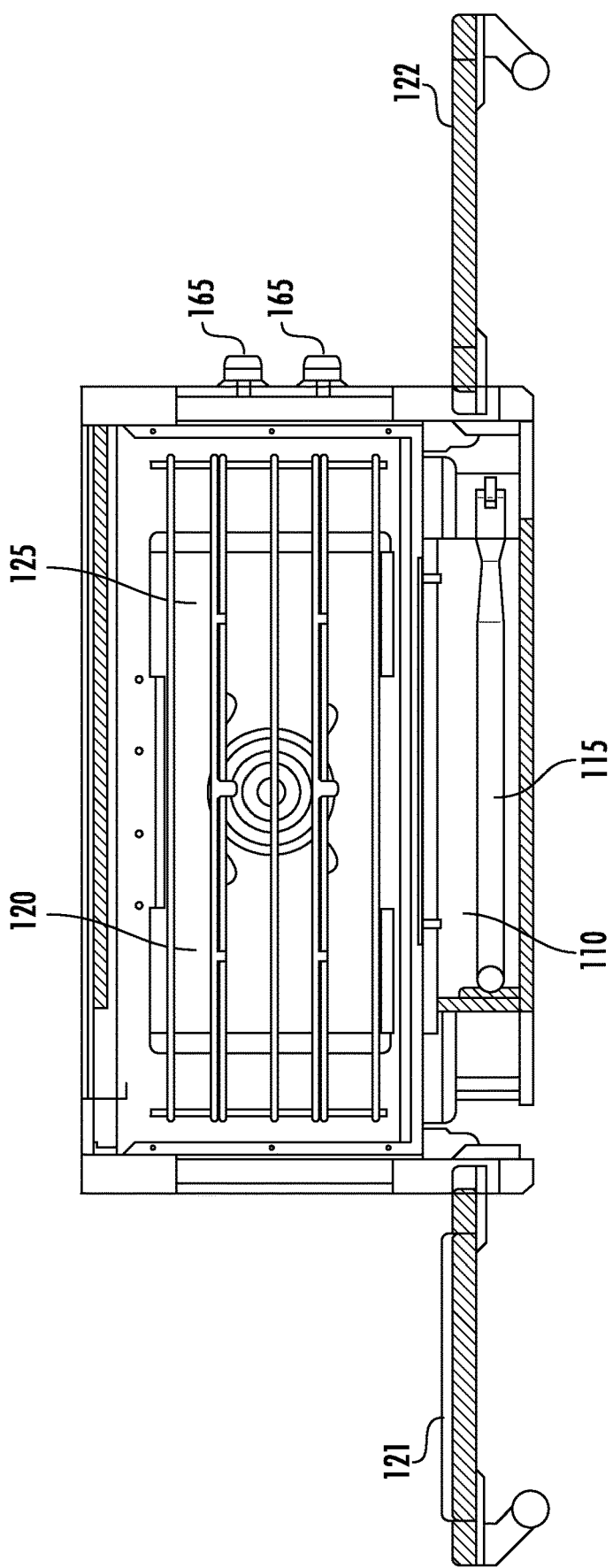
FIG. 4 is a cross-sectional elevation view of the example convection oven of FIG. 1, taken at section line B-B.
Figure 5:
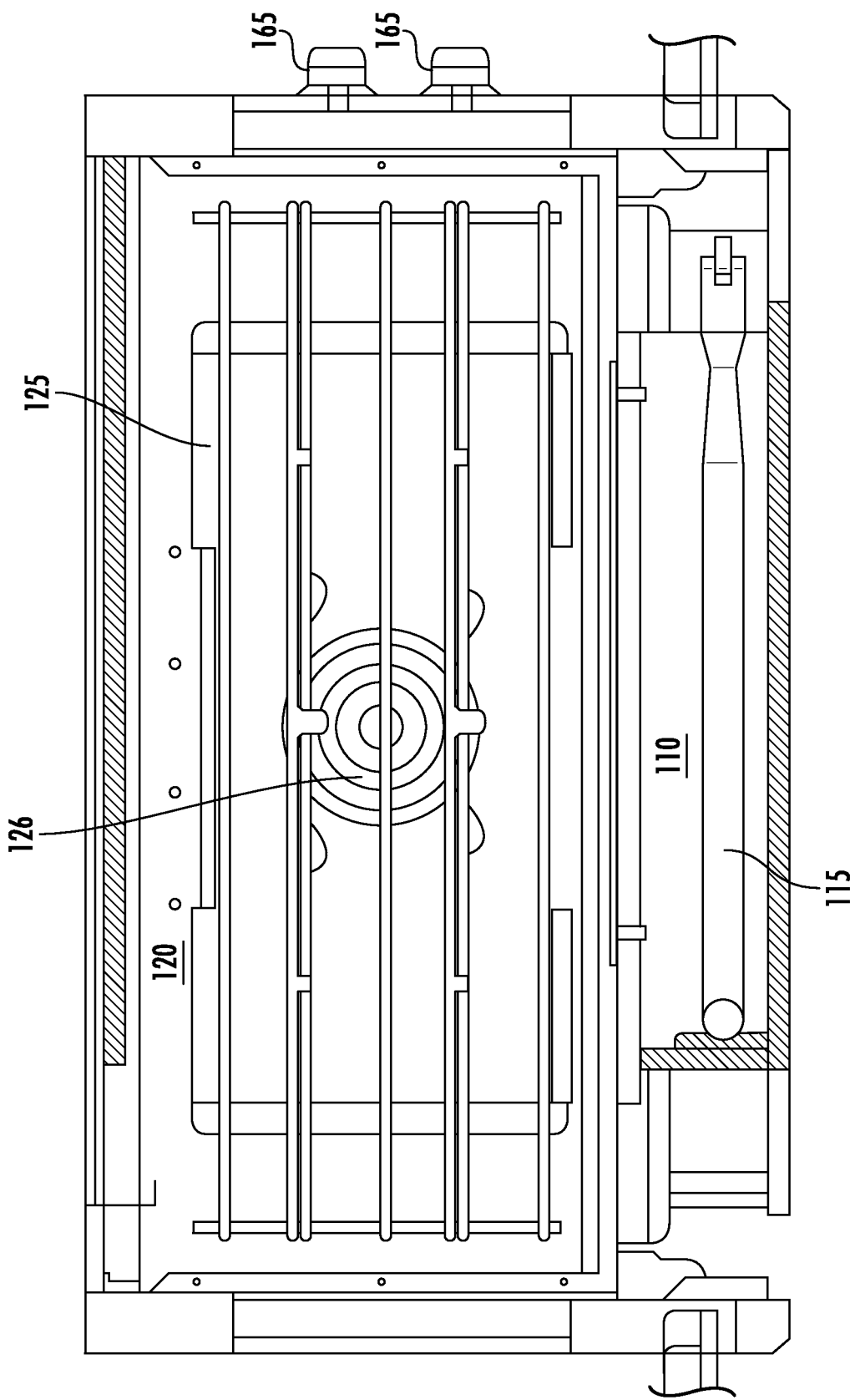
FIG. 5 is an expanded portion of FIG. 4, showing the cooking chamber and combustion chamber.

As is illustrated in FIG. 4, the convection oven 100 may further include a side sub-chamber 140 with a convection fan 150 to re-circulate hot oven air within the cooking chamber 120. The side sub-chamber 140 may be positioned within the cooking chamber 120. However, a baffle plate 125 may separate the side sub-chamber 140 from the cooking chamber 120. This baffle plate 125 may define the dimensions of the side sub-chamber 140. The solid portion of the baffle plate 125 may extend beyond the fan blade 151 perimeter that defines an operative portion of the convection fan 150, so that the blade assembly is centered with hole 126 in the baffle plate 125.

The combination of the rotating blades 151 of the convection fan 150 and convection baffle 125 may create optimum heat and air circulation within the cooking chamber 120, increasing overall heat transfer efficiency, recovering efficiency, and/or fuel efficiency. Following the basic theory of forced convective heat transfer, the addition of a convection fan can achieve higher heat transfer (and even heat distribution) than is capable in a non-convective (standard) oven design. The heat transfer characteristics and convective heat transfer coefficient are improved dramatically, increasing the speed for temperature rise. The baffle 125 may have openings 145 to ensure even heat distribution throughout the entire oven cooking chamber 120. The openings 145 may be at the sides and/or bottom. Furthermore, the baffle plate 125 may have alternative shapes, and may vent at least partially on 2 or 4 sides, with a center hole or perforated region 126 opposite the fan blades 150.

To position the side sub-chamber 140 within the cooking chamber 120, the baffle plate 125 may be attached to the side wall 124 of the cooking chamber 120 (as is shown in FIG. 6). In such an example, the side sub-chamber 140 may be positioned adjacent the side wall 124, as is seen in FIG. 6. The side wall 124 may refer to a wall that is orthogonal to the doors 121 and 122. That is, if the doors 121 and 122 are positioned on the front and rear of the convection oven 100, the side wall 124 may refer to the left side wall or the right side wall. By attaching the baffle plate 125 to the side wall 124 (which is orthogonal to the doors 121 and 122), the side sub-chamber 140 is not positioned in the rear of the convection oven 100. Thus, the convection oven 100 can have a door 121 (or door 122) positioned on the rear side of the convection oven 100. Therefore, unlike typical convection ovens, convection oven 100 can include doors 121 and 122 positioned on opposing sides of the cooking chamber 120.

The convection oven 100 may further include a sub-housing or control compartment 180. The sub-housing 180 may be disposed on the opposite side of wall 124 (i.e., on the side opposite of the side-sub chamber 140). Furthermore, the sub-housing 180 may extend the depth of the oven 100 (i.e., from door 121 to door 122) outside the cooking chamber 120 at the side having the convection fan 150. The sub-housing 180 may contain a motor 160 (for rotating the convection fan 150). Additionally, a cooling fan blade assembly 170 may be disposed in the sub-housing 180. The cooling fan 170 may also be coupled to the motor 160, allowing the motor 160 to rotate the cooling fan 170. As such, the motor 160 may rotate both the convection fan 150 and the cooling fan 170. Vents 163 may be disposed in a rear side of the sub-housing 180 to provide for exchange of air therein by the cooling fan 170.

The cooling fan 170 and motor 160 is preferably extremely low-profile. It is also preferable for the motor 160 to be able to operate at HIGH and LOW speeds. It is also preferably designed to be able to be left OFF while operating the convention oven 100 in its standard, non-convective mode, without damaging the fan motor 160 itself. The fan motor 160 may be easily accessed and/or serviced from inside the cooking chamber 120.

The sub-housing 180 may also contain gas control valves 165 for external modulation of the gas flow from an external source to the gas burner manifold 115. It may also contain additional oven controls (e.g., thermostat, indicator light, gas valve, etc.). Furthermore, these oven controls positioned in the sub-housing 180 may further be modulated (or otherwise controlled) by an external control system positioned elsewhere on the convection oven 100 (e.g., adjacent one of the doors 121 or 122).

In some examples, the convection oven 100 may be able to have two doors on opposing sides because the convection oven 100 incorporates a low profile convective fan motor 160 within its narrow sub-housing 180. Vent holes 163' may be positioned in strategic locations to help provide (or ensure) sufficient air flow to keeping the fan motor 160 cool. Also, a second fan system (i.e., cooling fan 170) may be coupled to the same motor 160, to generate constant cooling air to help cool off the motor 160 (and other electronics in the convection oven 100). Also, a unique baffling system may be formed by attaching the baffle plate 125 to the inner sidewall 124, providing uniform heat flow distribution throughout the cooking chamber 120, as is illustrated by the double headed arrows in FIG. 3. Additionally, the convection oven 100 may be designed to maximize the interior volume of the cooking chamber 120, while staying within a standard 36" width, allowing full sized sheet pans to be used in a front-to-back orientation (via doors 121 and 122). In such examples, the convection oven 100 may not be larger or wider than a conventional gas oven, but may still include convection abilities (e.g., it may include a convection fan) and may still include two doors on opposing sides. In contrast to convection oven 100, traditional fan systems are quite deep, making it difficult to attach to a wall of an oven without either increasing the overall width of the oven or reducing the oven cavity.

FIGS. 8-13 illustrate another example convection oven 100. The convection oven 100 of FIGS. 8-13 may be substantially similar to the convection oven 100 of FIGS. 1-7. However, the convection oven 100 of FIGS. 8-13 may further include a sub-cavity 190 and/or insulating material 210.

As is illustrated, in a preferred example, the combustion chamber 110 and cooking chamber 120 of convection oven 100 may be disposed in a sub-cavity 190. The shape and size of sub-cavity 190 may be defined by the doors 121 and 122, the dimensions of the convection oven 100 (e.g., the side, top, and bottom walls of the convection oven 100), and the sub-housing 180 (on the other side). The sub-cavity 190 may have a lower portion 191 disposed below the combustion chamber 110. The lower portion 191 may include vents 192 to allow air to enter from outside the oven. These vents 192 may optionally be (or include) one or more of front vents 1921, side vents 1922, rear vents 1923, and/or bottom vents 1924 (as shown in FIG. 8).

The sub-cavity 190 may further have one or more side vents 195 to allow fluid communication and exchange of air between the interior of the sub-housing 180 and the interior of the sub-cavity 190. The combination of multiple vents to bring outside air into the sub-housing 180 may sufficiently aid in keeping the electrical components below their rated maximum temperatures for continuous use.

Figure 12:
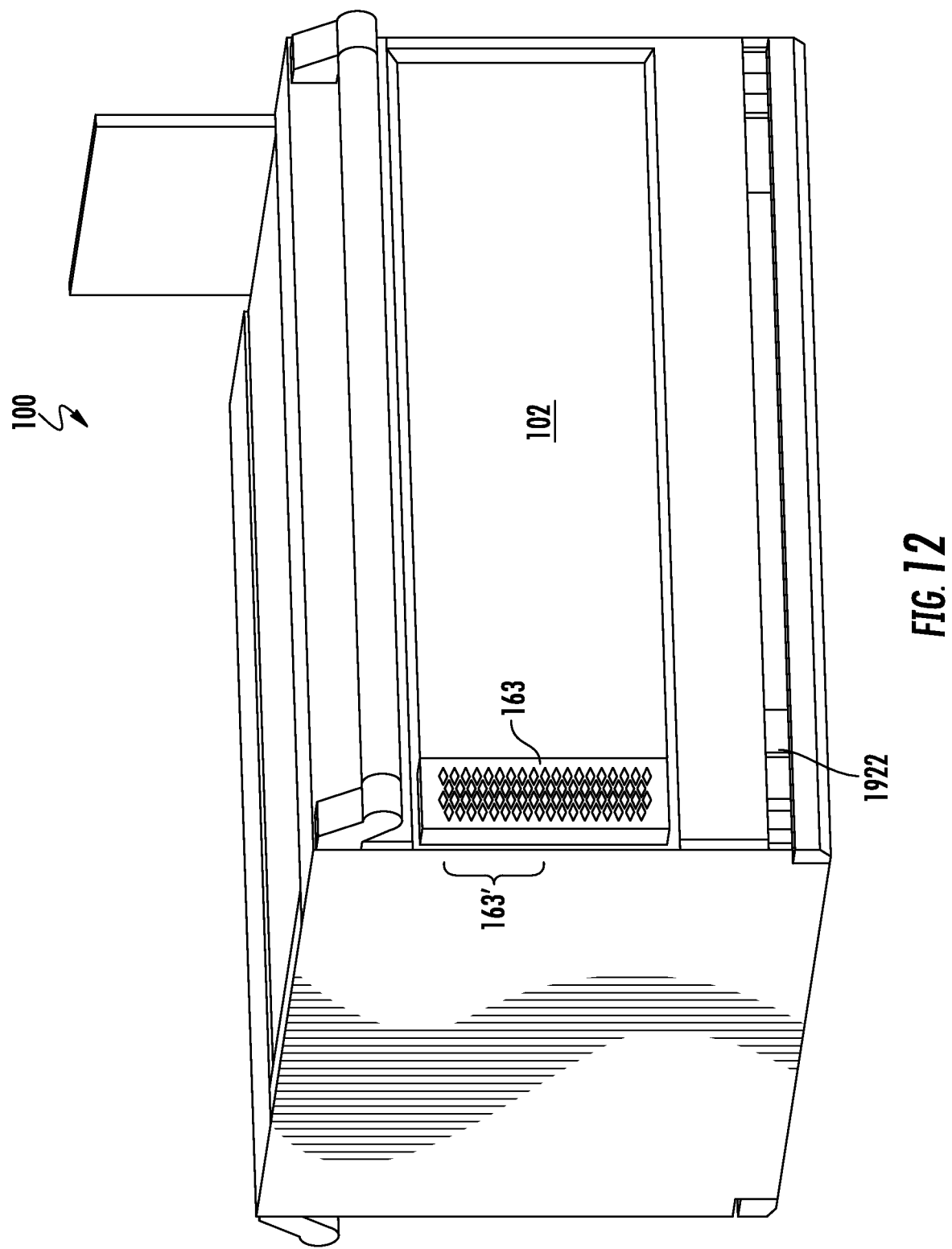
FIG. 12 is a front perspective exterior view of the example convection oven of FIG. 9.
Figure 13:
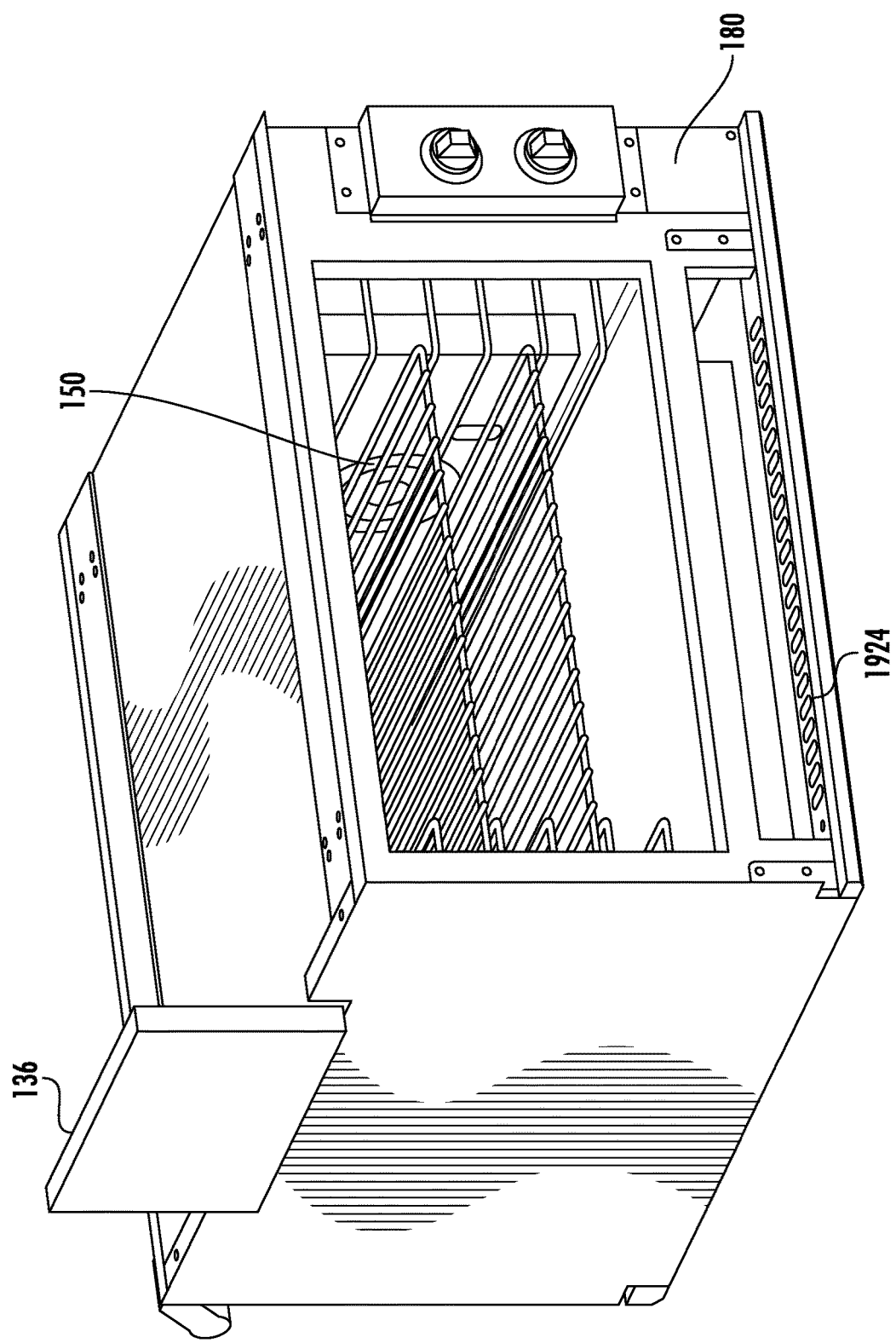
FIG. 13 is a front perspective exterior view of the example convection oven of FIG. 9, with the front door and a cover panel removed.

With the forced convection of the cooler outside air arriving from vents 195 and vents 192 (e.g., vent holes on the rear of the sub-housing 180), the cooling fan 170 may circulate and exchange air heated by convection or conduction from the cooking chamber 110 or combustion chamber 120. In such examples, the cooling fan 170 may generally vent hotter air in the sub-housing 180 out via upper vents 163', which are included in vent holes 163 in the rear of the sub-housing 180 (as shown in FIG. 12). The vent holes 163 may extend the majority of the height of the sub-housing 180, with the upper most vent holes 163' therein, allowing hotter air that rises to escape. It should be appreciated that additional vent holes can be placed on the upper exterior surface of the sub-housing 180.

Figure 8A:
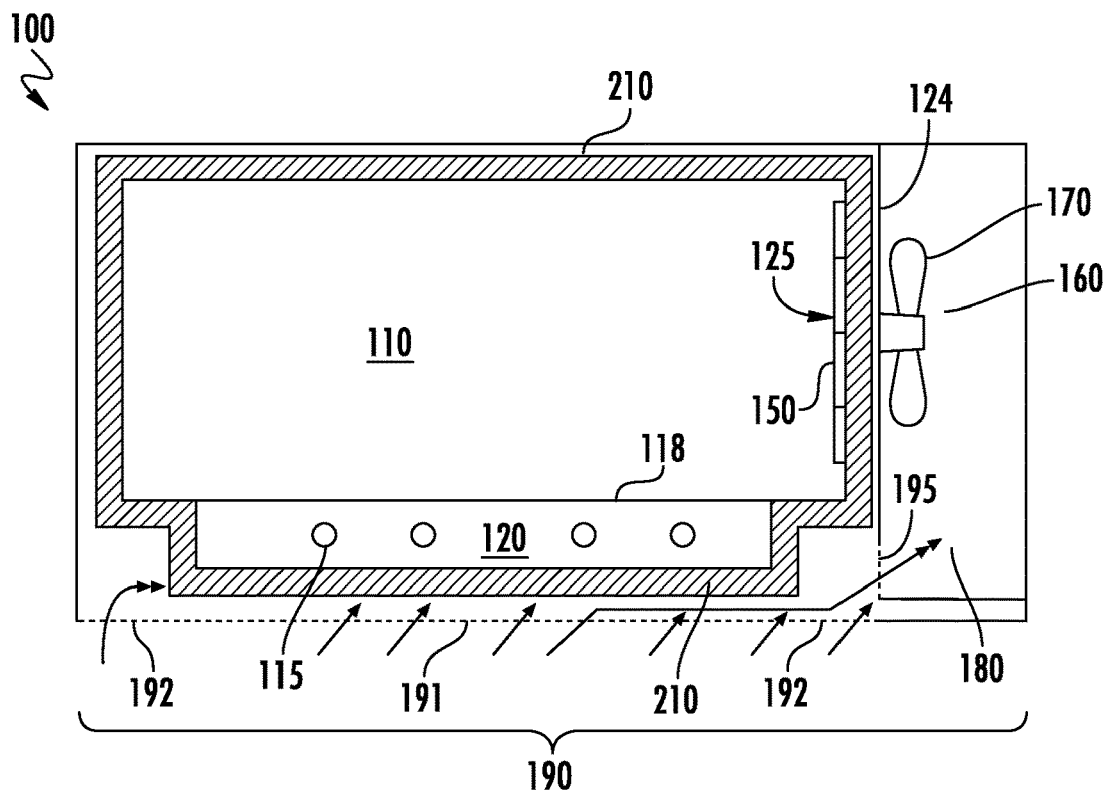
FIG. 8A is a cross-sectional view of an example convection oven having air vents.
Figure 8B:
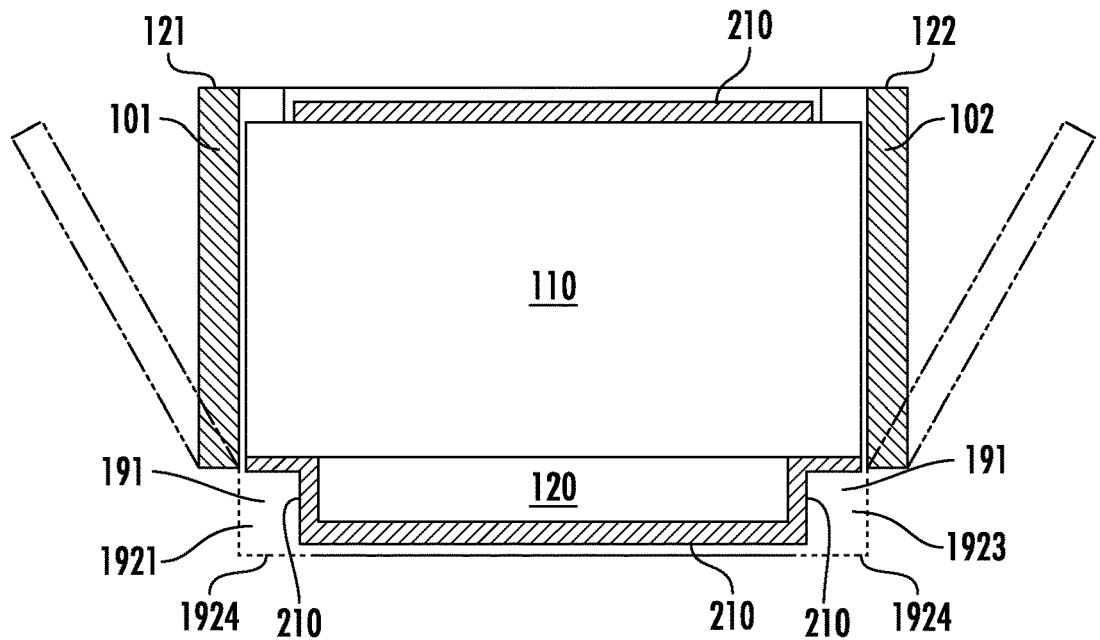
FIG. 8B is an orthogonal cross-section of FIG. 8, illustrating the relative transverse dimension of an example sub-cavity that is vented.
Figure 9:
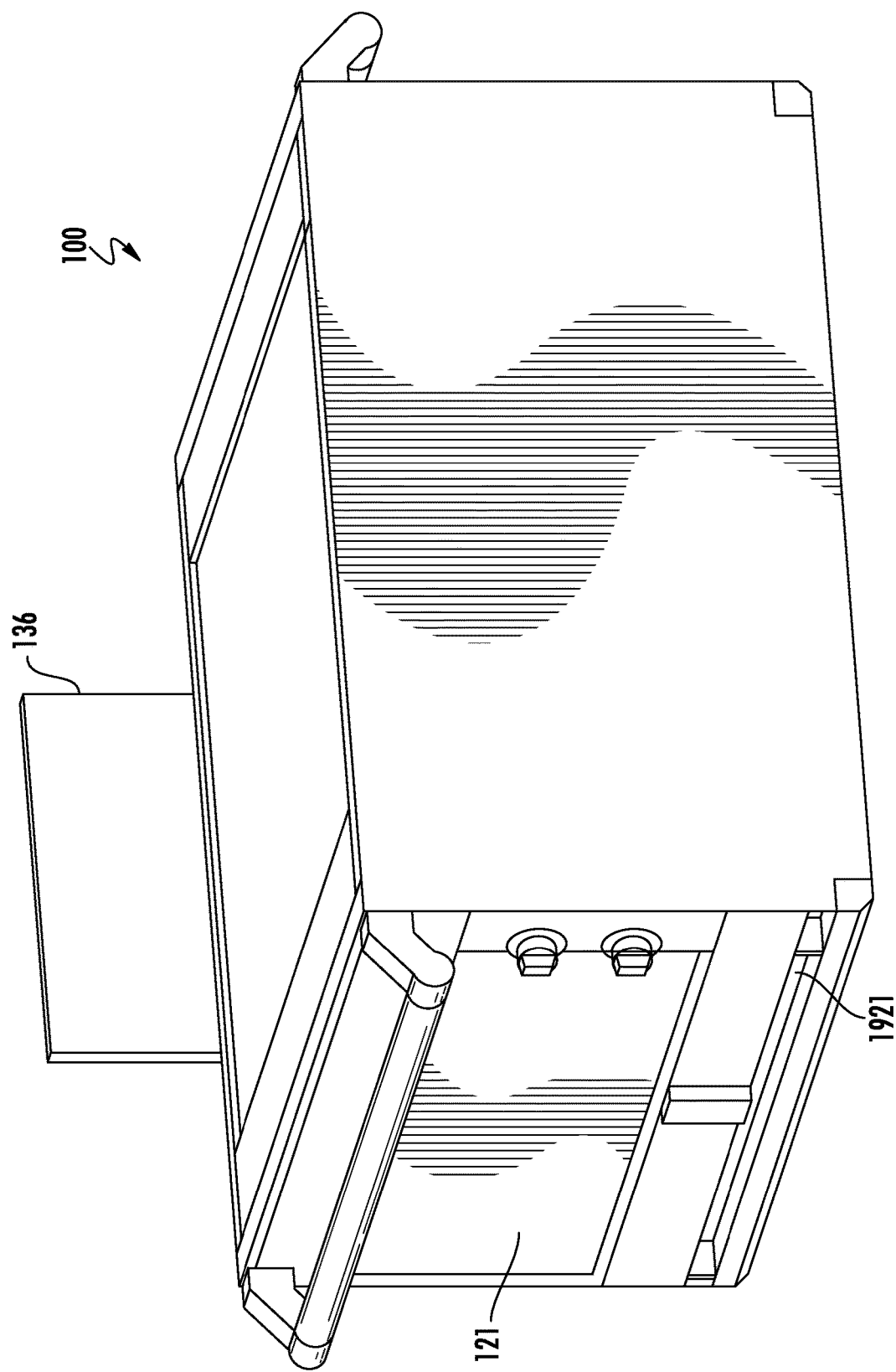
FIG. 9 is a side perspective exterior view of an example convection oven.
Figure 10:
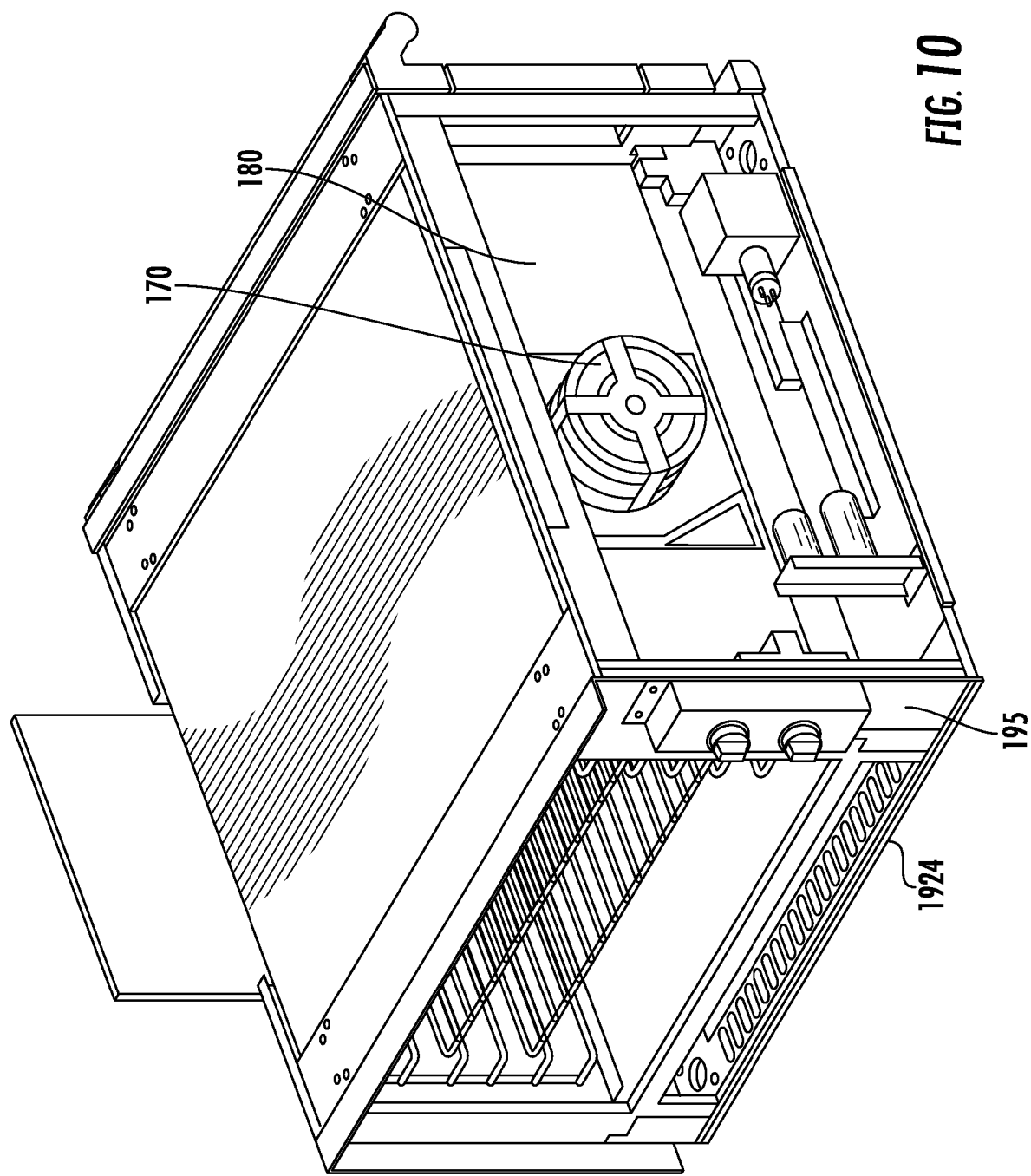
FIG. 10 is a side perspective exterior view of the example convection oven of FIG. 9, with the front door, front cover panel and side cover panel removed.
Figure 11:
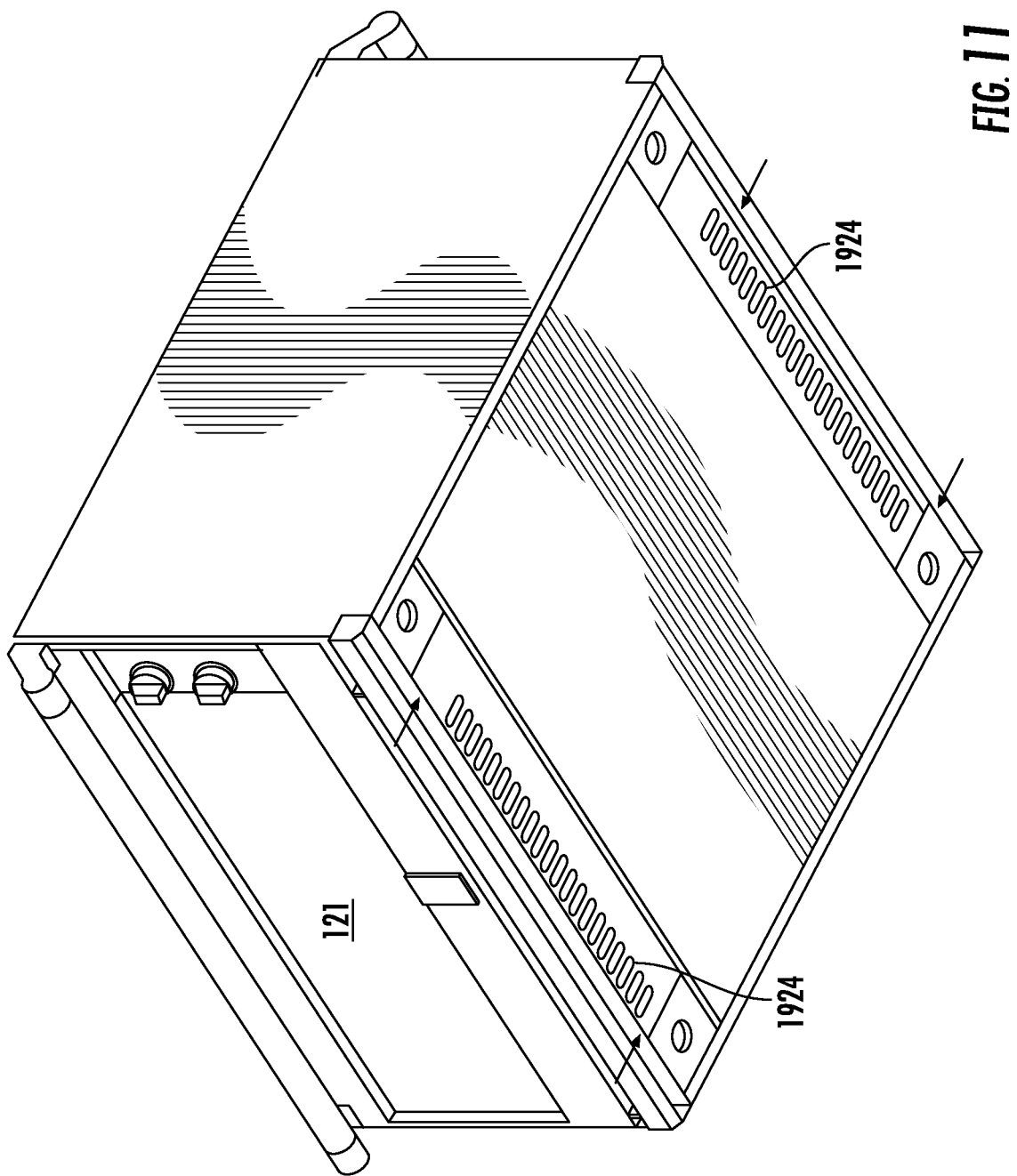
FIG. 11 is a bottom perspective exterior view of the example convection oven of FIG. 9.

As is discussed above, the convection oven 100 may further include insulating material 210 (as shown as the cross hatching in FIGS. 8A-8B). The insulating material 210 may be disposed within the sub-cavity 190 to cover the exterior of the cooking chamber 110 and/or the combustion chamber 120. However, in some examples, the lower portion 191 may not include the insulating material 210, so as to allow external air entering from vents 192 to flow therein, and further to allow external air entering from vents 195 to enter the sub-housing 180. The insulating material 210 may include any thermal insulating material suitable for use in a convection oven. Also, the thickness (or other dimensions) of the insulating material 210 may be increased (or decreased) as desired to further reduce (or avoid) heating of the electrical and/or electronic components in the sub-housing 180.

In some examples, a combination of additional insulating material 210 and vents 192 and 195 of sub-cavity 190 may be used to increase the maximum temperature of the oven, without the risk of overheating components in the housing 180. Also, because additional insulating material 210 may consume space that could be used for the cooking chamber 120, it may be preferable to increase the total area of the vents 192 and 195 (without increasing the amount or size of the insulating material 210).

Modifications, additions, and/or substitutions may be made to the convection oven 100, the components of the convection oven 100, and/or the functions of the convection oven 100 without departing from the scope of the specification. For example, the convection oven may include any type(s) of heating elements, may have any dimensions, may include additional components, and/or may not include one or more of the components discussed above.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, reorganizing, or removing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A convection oven comprising:
   a) a cooking chamber having a front door and a rear door opposing the front door;
   b) a combustion chamber disposed below at least a portion of the cooking chamber;
   c) a side flue conduit configured to direct hot air from the combustion chamber to the cooking chamber;
   d) a side sub-chamber with a convection fan configured to re-circulate at least a portion of the hot air within the cooking chamber, in which the side sub-chamber is disposed adjacent a side of the cooking chamber that is orthogonal to the front and rear door;
   e) a sub-housing positioned opposite the sub-chamber, the sub-housing including a motor configured to rotate the convection fan, and further including a cooling fan that is coupled to the motor and this is configured for exchanging air in the side sub-chamber; and
   f) a means for drawing air into the sub-housing that comprises a sub-cavity positioned below at least one of a front and a rear portion of the cooking chamber, wherein the sub-cavity is vented to the exterior of the convection oven and is in fluid communication with a lower portion of the sub-housing.

2. The convection oven of claim 1 further comprising a means for venting air from the sub-housing.

3. The convection oven of claim 2 wherein the means for venting air from the sub-housing comprises a rear vent on a side of the sub-housing.

4. The convection oven of claim 1 wherein the sub-housing comprises one or more components for controlling the convection oven.

5. The convection oven of claim 1 further comprising at least one external control on an outside of the sub-housing that is adjacent the front door, wherein the external control modulates a component inside the sub-housing that controls at least one aspect of the operation of the convection oven.

6. The convection oven of claim 1 further comprising thermal insulation surrounding at least a portion of the cooking chamber and the combustion chamber that is adjacent to and external to the sub-housing.

7. The convection oven of claim 1 further comprising at least one external control on an outside of the sub-housing that is adjacent the front door, wherein the at least one external control modulates the speed of the motor.

8. A convection oven comprising:
   a) a cooking chamber having a front door and a rear door opposing the front door;
   b) a combustion chamber disposed below at least a portion of the cooking chamber;
   c) a side flue conduit configured to direct hot air from the combustion chamber to the cooking chamber;
   d) a side sub-chamber with a convection fan configured to re-circulate at least a portion of the hot air within the cooking chamber, in which the side sub-chamber is disposed adjacent a side of the cooking chamber that is orthogonal to the front and rear door;
   e) a sub-housing positioned opposite the sub-chamber, the sub-housing including a motor configured to rotate the convection fan, and further including a cooling fan that is coupled to the motor and this is configured for exchanging air in the side sub-chamber;
   f) at least one external flue conduit configured to direct a portion of combustion gas outside of the convection oven; and
   g) a means for drawing air into the sub-housing that comprises a sub-cavity positioned below at least one of a front and a rear portion of the cooking chamber, wherein the sub-cavity is vented to the exterior of the convection oven and is in fluid communication with a lower portion of the sub-housing.

9. The convection oven of claim 8 further comprising at least one upper conduit to direct the portion of combustion gas from the cooking chamber to the at least one external flue conduit.

10. The convection oven of claim 8 wherein the at least one external flue conduit is disposed on an opposite side of the convection oven from the sub-housing.

11. The convection oven of claim 8 further comprising at least one external control on an outside of the sub-housing that is adjacent the front door, wherein the external control modulates a component inside the sub-housing that controls at least one aspect of the operation of the convection oven.

12. The convection oven of claim 11 wherein the at least one external control modulates the speed of the motor.

13. The convection oven of claim 8 further comprising thermal insulation surrounding at least a portion of the cooking chamber and the combustion chamber that is adjacent to and external to the sub-housing.

\* \* \* \* \*